United States Patent [19]

Lu et al.

[11] Patent Number: 5,034,898

[45] Date of Patent: Jul. 23, 1991

[54] SYSTEM INCLUDING INDUCTIVE LEARNING ARRANGEMENT FOR ADAPTIVE MANAGEMENT OF BEHAVIOR OF COMPLEX ENTITY

[75] Inventors: Stephen C. Lu, Champaign, Ill.; Henry S. Teng, Groton; Mitchell M. Tseng, Sudbury, both of Mass.

[73] Assignee: Digital Equipment, Maynard, Mass.

[21] Appl. No.: 346,133

[22] Filed: May 2, 1989

[51] Int. Cl.[5] .............................................. G06F 15/18
[52] U.S. Cl. ..................................................... 364/513
[58] Field of Search ........................................ 364/513

[56] References Cited

PUBLICATIONS

A Temporally Oriented Data Model; G. Ariav; ACM Transactions on Database Systems; vol. 11, No. 4; Dec. 1986; pp. 499–527.
A Taxonomy of Time in Databases; Snodgrass et al.; pp. 236–246; 1985 ACM 0-89791-160-1/85/005/0236.
Episodic Monitoring of Time-Oriented Data for Heuristic Skeletal-Plan Refinement; Tu et al.; Knowledge Systems Laboratory; Aug. 1988; Report No. KSL 87-70.
Maintaining Knowledge About Temporal Intervals; Allen et al.; Communications of the ACM; Nov. 1983; vol. 26, No. 11; pp. 832–843.
The Mechanisms of Temporal Inference; Fox et al.; Proceedings of the Workshop on Space Telerobotics; JPL 87-13, vol. III; 7/1987; pp. 9–15.
"A Machine Learning Approach to the Automatic Synthesis of Mechanistic Knowledge for Engineering Decision-Making," Stephen C.-Y. Lu and Kaihu Chen, (AI EDAM) (1987) 1(2), 109–118.
"An Intelligent Framework for Engineering Decision-Making," Stephen C.-Y. Lu, SAE Technical Paper Series, Int'l. Congress and Exposition, Detroit, MI, Feb. 23–27, 1987.
Thesis: "An Inductive Engine for the Acquisition of Temporal Knowledge,", Kaihu Chen, Univ. of Illinois at Urbana-Champaign, 1988 (Dept. of Computer Science).

Primary Examiner—Allen R. MacDonald
Attorney, Agent, or Firm—Kenyon & Kenyon

[57] ABSTRACT

A system and method for adaptively managing the behavior of, for example, a digital data processing system, using inductive learning techniques. The new system includes a data acquistion portion that acquires event data in response to selected events. An inductive engine generates profile knowledge in response to acquired event data during a learning phase, for storage in a profile knowledge store. A profile comparator, during an operational phase, subsequent to the learning phase, performs a verification operation in connection with comparing event data to said profile knowledge stored in said profile knowledge store. A control portion enables event data acquired by said data acquisition portion to be directed to the inductive engine during a learning phase and to the profile comparator during an operational phase to thereby permit the comparator to perform a verification operation in connection with said event data acquired during the operational phase.

10 Claims, 4 Drawing Sheets

SYSTEM INCLUDING INDUCTIVE LEARNING ARRANGEMENT FOR ADAPTIVE MANAGEMENT OF BEHAVIOR OF COMPLEX ENTITY

BACKGROUND OF THE INVENTION

The invention relates generally to the field of digital computer-assisted information and knowledge processing systems, and more particularly to a system and method for adaptively managing changing behavior of a complex entity using knowledge acquired through artificial intelligence inductive learning techniques.

Artificial intelligence ("AI") research, which is a part of the field of computer science, is directed to the development of systems, using digital computers, to mimic the performance of human intelligent behavior. Since the late 1970's, AI research has gradually evolved from developing small prototypes in academic research laboratories to development of robust systems that can make significant impacts on many real-world tasks outside the laboratory. Of particular importance among AI-related applications are knowledge-based expert systems which incorporate knowledge from human experts, in particular application domains, to provide advice to users.

While different application domains often require a number of different detailed considerations, development of knowledge based expert systems generally involves three general considerations in common, namely, knowledge acquisition, knowledge representation and knowledge utilization. Of the three general considerations, the most important is knowledge acquisition, since most current knowledge-based expert systems use deductive inference techniques. Currently, development of knowledge-based expert systems requires a knowledge engineer to interview, in many cases iteratively in a number of interview sessions, one or more human experts. Problems arise since the interviews are often ill-structured, time consuming and prone to error. Furthermore, the assistance that deductive knowledge-based expert systems can provide is generally limited by the quantity, variety and accuracy of the knowledge that it contains.

Furthermore, the knowledge acquired in this manner is generally heuristic, that is, it represents facts and empirical associations, or patterns, that experts in the particular domain have developed over long periods of time in working with particular examples in the domain. Heuristic knowledge is often of limited utility, since it is not easily verified and it is difficult to update. Furthermore, deductive knowledge-based expert systems typically can only be used in connection with circumstances within the domain of the knowledge which they contain, and, if a circumstance is unexpected and outside of that domain, the expert system will not be able to provide assistance in that circumstance.

AI researchers are also working in areas of machine learning techniques, to permit computers to acquire knowledge directly, rather than or in addition to, requiring knowledge to be provided by experts. Several knowledge acquisition techniques use inductive inference to infer knowledge in particular domains from training examples in those domains. These inductive learning systems generate, from the information provided as domain examples, domain knowledge that effectively comprises descriptions of generic patterns. If properly designed, the transition from information to knowledge can serve as a potential remedy to the knowledge acquisition problem. In the past, researchers have suggestion that inductive learning techniques be applied as automatic knowledge acquisition tools in developing knowledge-based expert systems, using training examples collected from data from actual operation in the domain or from simulation models.

SUMMARY OF THE INVENTION

The invention provides a new and improved system and method for adaptive management of behavior of a complex system using inductive learning techniques. In the invention, event records are taken directly from the complex system and used as training examples to an inductive learning system. The inductive learning system uses records collected to generate patterns that describe the generic nature of behavior of the complex system, which will then be used to monitor future events in the complex system. If event records, representing future events, show deviation from the patterns, the system takes predetermined actions, which may include adaptation to the deviations, to manage the changing behavior.

In brief summary, the new system includes a data acquisition portion that acquires event data in response to selected events. An inductive engine generates profile knowledge in response to acquired event data during a learning phase, for storage in a profile knowledge store. A profile comparator, during an operational phase, subsequent to the learning phase, performs a verification operation in connection with comparing event data to the profile knowledge stored in said profile knowledge store. A control portion enables event data that was acquired by the data acquisition portion to be directed to the inductive engine during a learning phase and to the profile comparator during an operational phase to thereby permit the comparator to perform a verification operation in connection with the event data that was acquired during the operational phase.

In another aspect, the invention provides a new method. Initially, during a learning phase, training event data is acquired in response to selected events. Subsequently, an inductive engine is enabling, during said learning phase, to receive acquired training event data and generate in response thereto profile knowledge, which is maintained for use during a later operational phase. Subsequently, during the operational phase, operational event data is acquired in response to selected events, and the profile knowledge and said operational event data is used in a verification operation in connection with said operational event data.

BRIEF DESCRIPTION OF THE DRAWINGS

This invention is pointed out with particularly in the appended claims. The above and further advantages of this invention may be better understood by referring to the following description taken in conjunction with the accompanying drawings, in which:

FIGS. 2A through 2B-2 are flow diagrams illustrating the operation of the system depicted in FIG. 1.

DETAILED DESCRIPTION OF AN ILLUSTRATIVE EMBODIMENT

Figure 1:
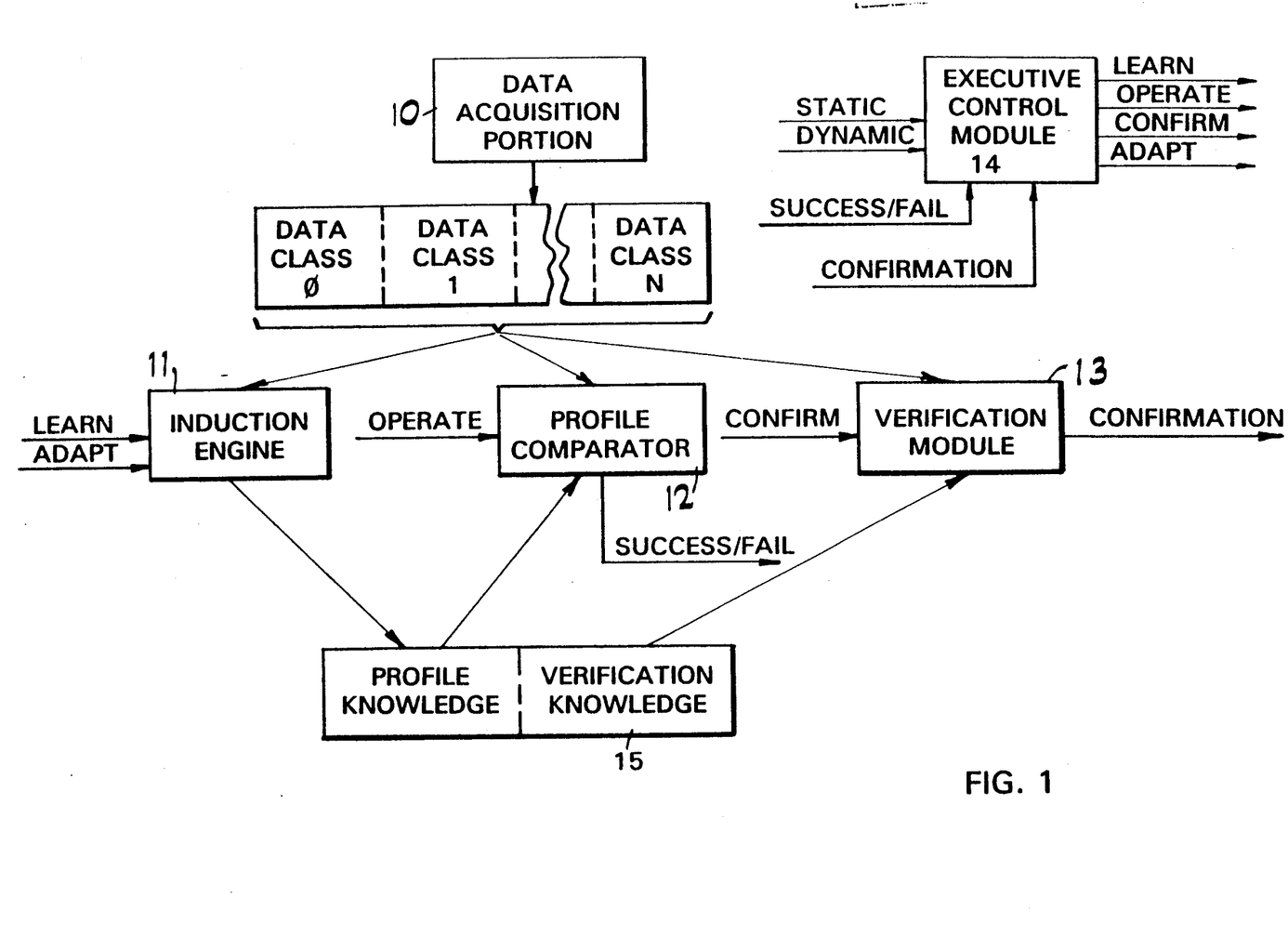
FIG. 1 is a functional block diagram of a system constructed in accordance with the invention.
Figure 2A:
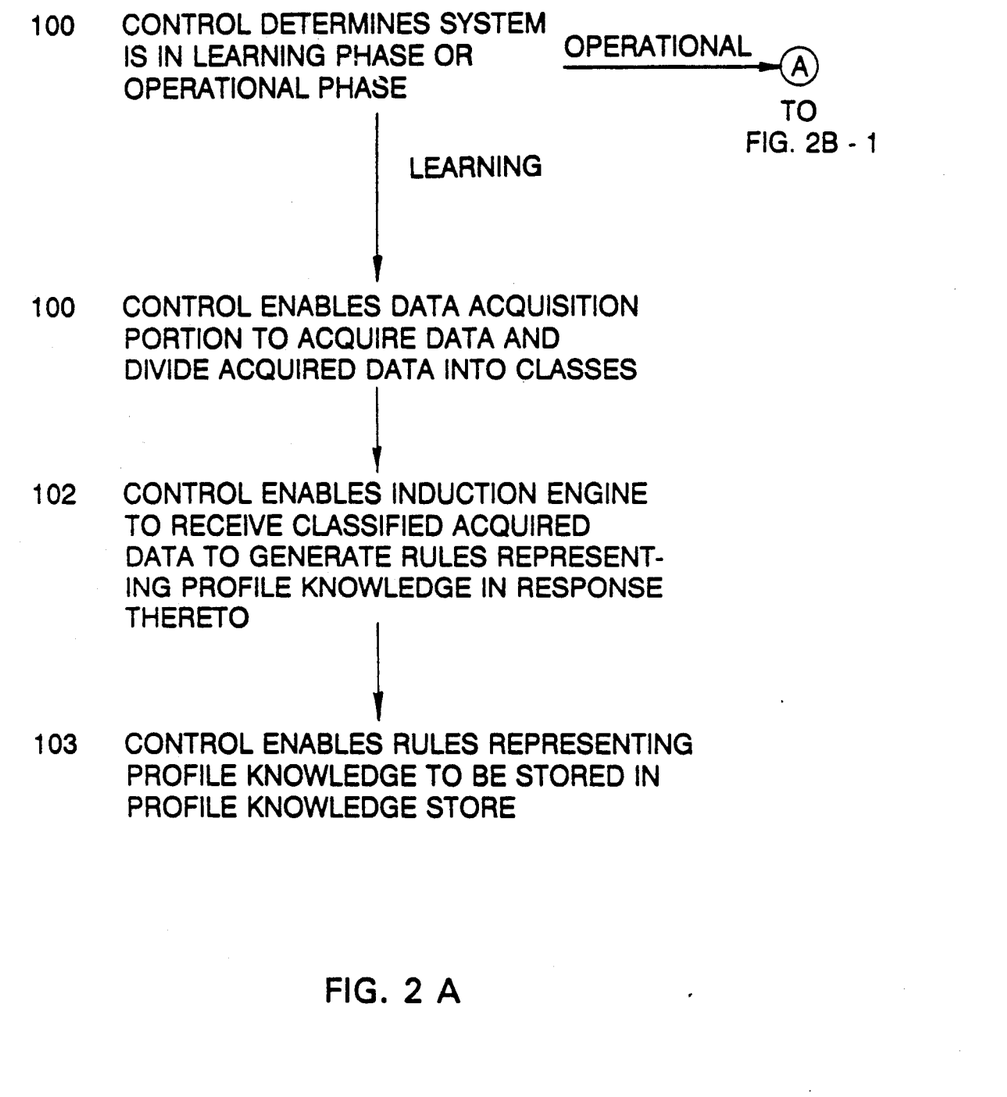
Figure 2B:
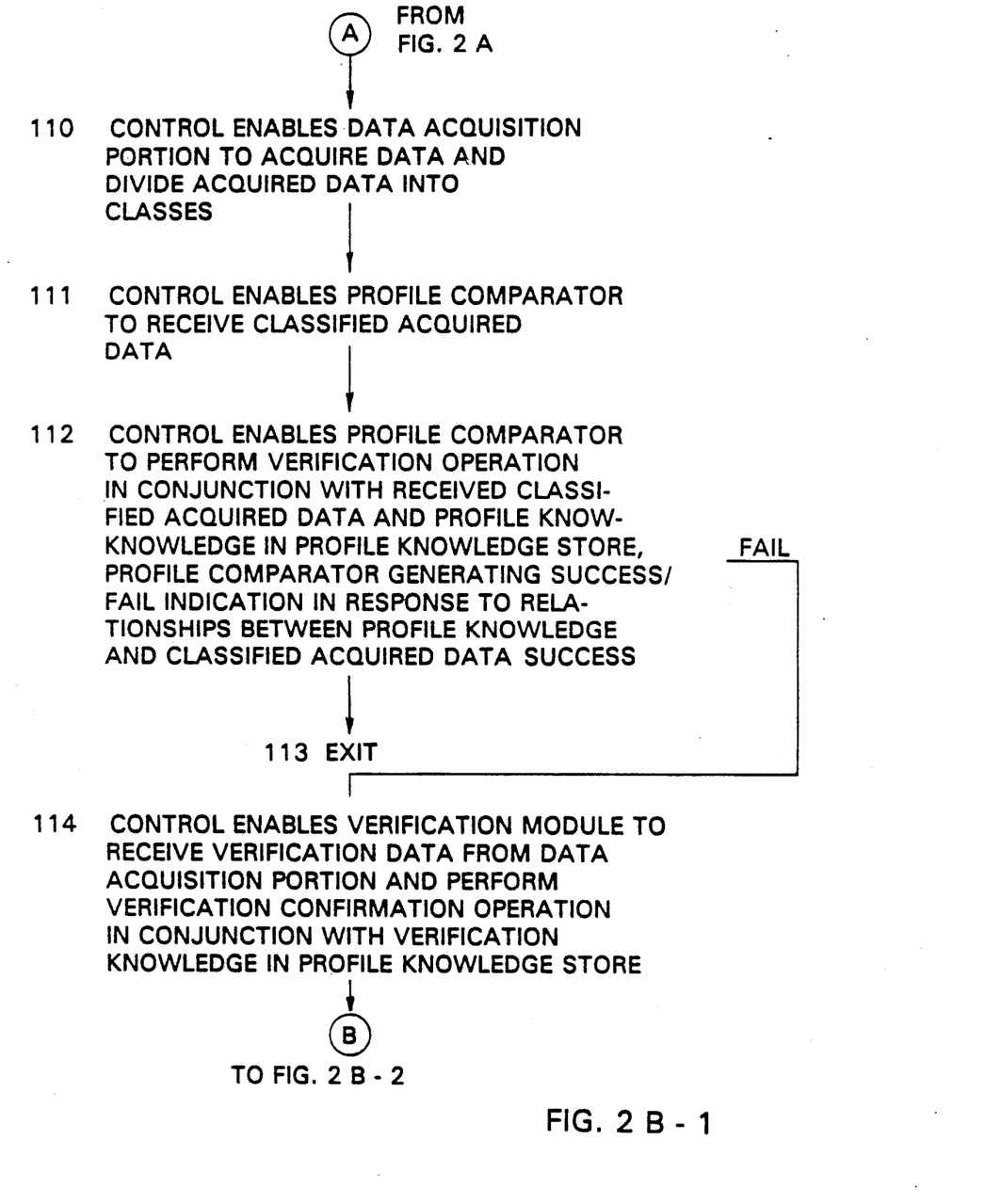
Figure 2B:
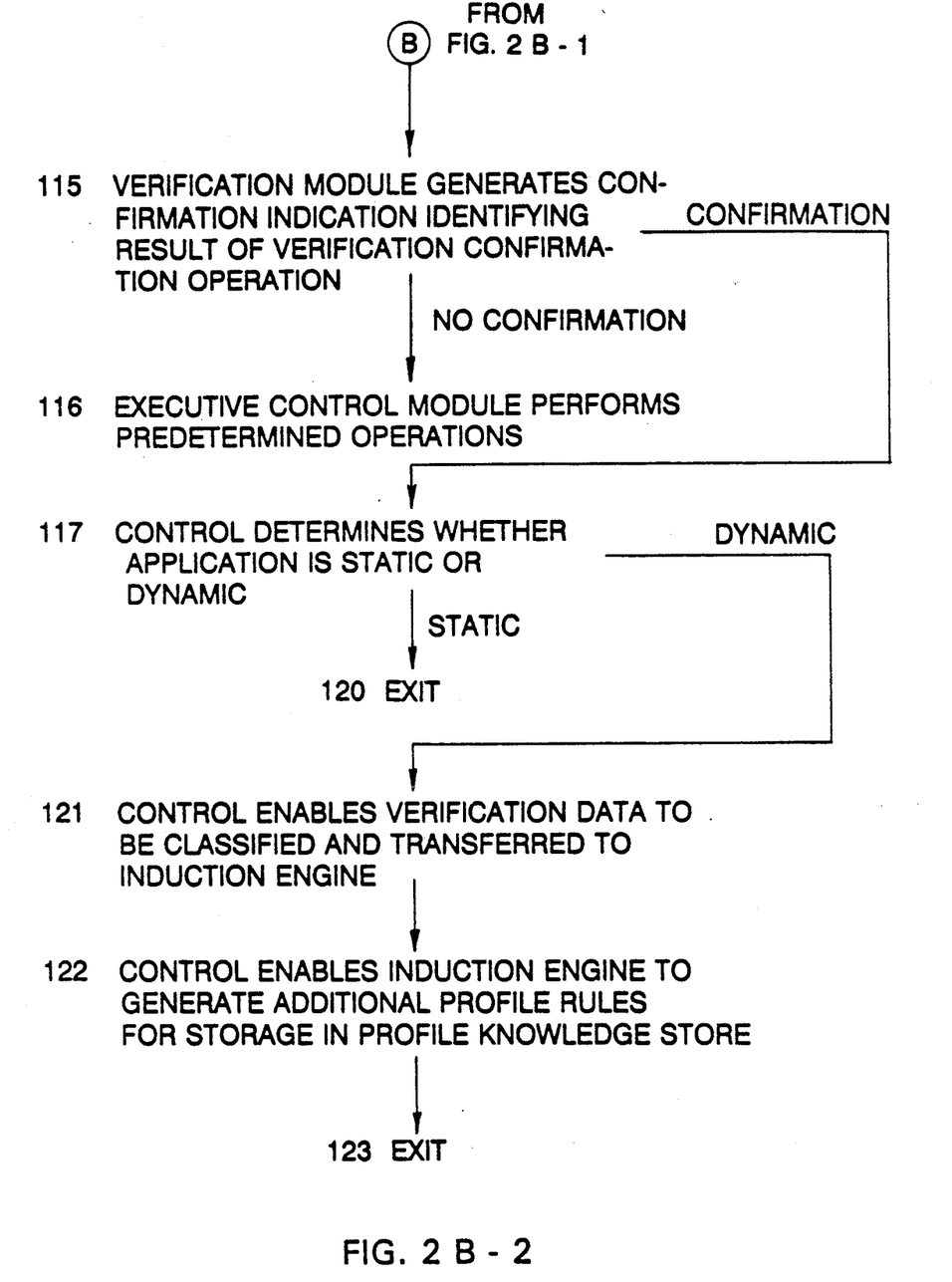

FIG. 1 depicts a block diagram of, and FIGS. 2A through 2B-2 depict flow diagrams of operation of, an adaptive management system for managing a complex system, constructed in accordance with the invention. In one particular example, which will be described below following the description of the FIGS., a specific example of an adaptive management system will be described for an application domain in which it provides security, for, for example, user account level activities in a digital data processing system. With reference to the FIGS., an adaptive management system constructed in accordance with the invention includes a data acquisition portion 10, an induction engine 11, a profile comparator 12 and a verification module 13, all of which operate under the control of an executive control module 14.

Under control of the exective control module 14, the data acquisition portion 10 acquires event data from predetermined data sources, such as, for example, a user or another entity in conjunction with which the complex system is being used. Each event data item includes one or more data elements that the data acquisition portion 10 groups into predetermined heuristic classes under control of the executive control module 14 and provides the classified acquired event data to the induction engine 11, profile comparator 12 or verification module 13 under control of the executive control module 14. The particular heuristics that define the classes into which the acquired data elements are grouped is generally determined by the particular application domain of the complex system managed by the adaptive management system. One set of heuristics, for the security application domain, is described below.

The system operates in two general phases, namely, a LEARN phase and an OPERATE phase, as well as a CONFIRM sub-phase and an ADAPT sub-phase during the OPERATE phase. The executive control module 14 enables the data acquisition portion 10 to provide the classified acquired event data to the induction engine 11 during a LEARN phase. The induction engine 11 processes the classified acquired event data and its constituent data elements, by an inductive learning arrangement, and generates in response thereto, as profile knowledge, profile rules that are stored, under control of the executive control module 14, in a profile knowledge store 15. The profile rules contain generalized knowledge of sequences of event data items as well as relationships among data elements in the classified acquired event data provided by the data acquisition portion 10 during the learning phase. The profile knowledge store 15 stores the profile rules generated by the induction engine 11 during the LEARN phase and also additional verification knowledge, which is used, as described below, during the CONFIRM sub-phase. Depending on the application domain of the adaptive management system, the additional verification knowledge may be provided by a system operator or a system developer, as also described below.

After completion of the LEARN phase, the executive control module 14 enables the initiation of the OPERATE phase. During the OPERATE phase, the executive control module 14 enables the data acquisition portion 10 to acquire an event data item and perform the classification operation, as in the LEARN phase. Initially, the executive control module 14 enables the profile comparator 12 to receive the classified acquired event data item from the data acquisition portion 10 and to use it in processing the profile rules stored in the profile knowledge store 15. In processing the profile comparator 12 attempts to determine whether the classified acquired event data item corresponds to the stored profile rules, thereby determining whether the classified acquired data from the data acquisition portion 10 during the OPERATE phase corresponds to the classified acquired data received during the LEARN phase. More specifically, the provide comparator 12 determines whether the series of data elements in the acquired event data item during the OPERATE phase have the same relationships as those learned during the learning phase, as defined in the profile rules in the profile knowledge store 15. If so, the profile comparator 12 generates a SUCCESS/FAIL indication of SUCCESS. If, on the other hand, the profile comparator 12 determines that the classified acquired data received during the OPERATE phase does not correspond to the classified acquired data received during the LEARN phase, the profile comparator 12 genrates a SUCCESS/FAIL indication of FAIL.

The SUCCESS/FAIL indication of SUCCESS indicates that the classified acquired event data item obtained from the entity and processed by the profile comparator 12 represents a condition indicating that operation of the complex system during the OPERATE phase corresponds to its operation during the LEARN phase. The executive control module 14 receives the SUCCESS/FAIL indication from the profile comparator 12. In the response to a SUCCESS/FAIL indication of SUCCESS, the operations performed by the executive control module 14 depend on the nature of the application environment, that is, the entity, in which the system is being used. The executive control module 14 may, for example, indicate to an operator the SUCCESS indication and allow the complex system to continue operation.

On the other hand, a SUCCESS/FAIL indication of FAIL indicates that the classified acquired data obtained from the entity and processed by the profile comparator 12 represents a condition indicating that operation of the complex system during the OPERATE phase does not correspond to its operation during the LEARN phase. If the executive control module 14 receives from the profile comparator 12 a SUCCESS/FAIL indication of FAIL, it initiates a CONFIRM sub-phase, in which it enables the verification module 13 to perform, in combination with the data acquisition portion 10, a confirmation operation to determine a correspondence between verification knowledged stored in the profile knowledge store 15 and additional data elements acquired by the data acquisition portion 10 under control of the executive control module 14. The verification knowledge is provided by an operator or system developer for use as a secondary check that operation of the complex system is satisfactory, even though the classified acquired event data item gave rise to the SUCCESS/FAIL indication of FAIL. If the additional data elements acquired by the data acquisition portion 10 during the CONFIRM sub-phase corresponds to the verification knowledge in the profile knowledge store 15, the verification module 13 generates a CONFIRMATION indication, in response to which the executive control module 14 performs operations described above in connection with a SUCCESS/FAIL indication of SUCCESS from the profile comparator 12.

In addition, following the CONFIRM sub-phase, if the verification module 13 generates the CONFIRMATION indication, the operations of the executive control module 14 depend on the nature of the complex system in connection with which the adaptive management system is being used. The complex system may, for example, be static, in which case the profile knowledge in the profile knowledge store 15 does not change during operation of the complex system. The complex system is static if the executive control module 14 receives a STATIC indication from external elements (not shown). If the executive control module 14 receives the STATIC indication, upon receipt of a SUCCESS or CONFIRMATION indication, the executive control module 14 notifies the complex system of the success and then exits. The complex system may thereafter perform any number of diverse operations, depending on its nature and design.

If, on the other hand, the entity is dynamic, the profile knowledge in the profile knowledge store 15 may change as a result of operations during the OPERATE phase and the CONFIRM sub-phase. The complex system is dynamic if the executive control module 14 receives a DYNAMIC indication from external elements (not shown). If the executive control module 14 is receiving the DYNAMIC indication, and it receives the CONFIRMATION indication, the executive control module 14 initiates an ADAPT sub-phase, in which it enables the induction engine 11 to obtain the classified acquired event data for which the profile comparator originally generated a SUCCESS/FAIL indication of FAIL. The executive control module 14 then enables the induction engine 11 to generate additional profile rules for storage in the profile knowledge store 15 for use subsequently during the OPERATE phase. The ADAPT sub-phase thus enables the system to adapt the condition of the profile rules in the profile knowledge store 15 to data acquired subsequent OPERATE phase.

It will be appreciated that the executive control module 14 may enable the ADAPT sub-phase following a SUCCESS/FAIL indication of FAIL, instead of initiating a CONFIRM sup-phase, or following a receipt of a CONFIRMATION indication during the CONFIRM sub-phase. In both cases, the executive control module 14 enables the classified data which gave rise to the SUCCESS/FAIL indication of FAIL to be transferred to the induction engine 11, which generates additional rules for storage in the profile knowledge store 15. The additional rules are available for use in conjunction with subsequently acquired data during the OPERATE phase. The executive control module 14 may also notify the entity of the SUCCESS/FAIL indication of FAIL and the classified acquired data that the induction engine 11 processed.

On the other hand, if the verification module 13, during the CONFIRM sub-phase, determines that the additional data elements acquired by the data acquisition portion 10 do not correspond to the verification knowledge in the profile knowledge store 15, the verification module 13 does not generate a CONFIRMATION indication. At the point, the executive control module 14 performs predetermined operations depending on the nature of the adaptive management system and the complex system.

The executive control module 14 depicted in FIG. 1 has been described as generating the ADAPT indication in response to, among other indications, the STATIC or DYNAMIC indications. However, it will be appreciated that the STATIC and DYNAMIC indications are not necessary in an adaptive management system for a dynamic complex system, that is, one in which the adaptive management system's executive control module 14 always generates an ADAPT indication to initiate an ADAPT sub-phase following a CONFIRM sub-phase. Similarly, the STATIC and DYNAMIC indications are not necessary in an adaptive management system for a static complex system, that is, one in which the adaptive management system's executive control module 14 never generates an ADAPT indication to initiate an ADAPT sub-phase following a CONFIRM sub-phase. In either case, the executive control module 14 with respectively generate or not generate the ADAPT indication in response to the CONFIRMATION indication.

The specific operations performed by the elements depicted in FIG. 1 are described in FIGS. 2A through 2B-2. FIG. 2A depicts the operations performed during the LEARN phase, and FIGS. 2B-1 and 2B-2 depict the operations performed during the OPERATE phase. With reference to FIG. 2A, the executive control module 14 initially determines whether the system is in the LEARN phase or in the OPERATE phase (step 100). If the executive control module 14 determines that the system is in the OPERATE phase, it steps to the sequence depicted in FIG. 2B-1.

If, on the other hand, the executive control module 14 determines that the system is in the LEARN phase, it enables the data acquisition portion 10 to acquire data and divide it into predetermined classes (step 101). The executive control module 14 thereafter enables the induction engine 11 to receive the classified acquired data from the data acquisition portion 10 and generate in response thereto profile rules (step 102) which are stored in the profile knowledge store 15 (step 103).

If, in step 100, the executive control module 14 determines that the system is in the OPERATE phase, it sequences to step 110 in which it enables the data acquisition portion 10 to acquire data and divide it into predetermined classes (step 110). The executive control module 14 thereafter enables the profile comparator 12 to receive the classified acquired data (step 111) and perform a verification operation in conjunction with the profile knowledge in the profile knowledge store 15 (step 112). At the end of the verification operation, the profile comparator 12 generates a SUCCESS/FAIL indication in response to the relationships between the profile knowledge in the profile knowledge store 15 and the classified acquired data from the data acquisition portion 10.

If the SUCCESS/FAIL indication indicates SUCCESS, the system exits (step 113). In exiting the executive control module 14 may notify the entity of the SUCCESS indication, and the entity may use the notification of the SUCCESS indication in a predetermined manner which depends on the nature of the entity.

If, on the other hand, the SUCCESS/FAIL indication indicates FAIL, the executive control module 14 sequences to steo 114 to commence the CONFIRM sub-phase of the OPERATE phase. In step 114, the executive control module 14 enables the verification module 13 to receive additional data, which it uses as verification data, from the data acquisition portion 10, and to perform a verification confirmation operation in conjunction with the verification knowledge in the profile knowledge store 15 (step 115). If the verification module 13 determines that the verification data from the data acquisition portion 10 corresponds to the verification knowledge in the profile knowledge store 15, it generates a CONFIRMATION indication indicating success of the CONFIRM sub-phase, but if the verification module determines that the verification data from the data acquisition portion 10 does not correspond to the verification knowledge in the profile knowledge store 15, the CONFIRMATION indication is not generated. If the CONFIRMATION indication is not generated, the executive control module 14 sequences to step 116 to initiate predetermined operations, which depend on the nature of the complex system.

If the verification module 13, in step 115 generates the CONFIRAMTION indication during the CONFIRM sub-phase, the subsequent operations depend on whether the executive control module 14 determines that the entity is static or dynamic, as determined by the condition of a STATIC indication and a DYNAMIC indication (step 117). In response to a STATIC indication, which indicates that the profile knowledge in the profile knowledge store 15 is not to change during the OPERATE phase, the executive control module 14 exits (step 120). On the other hand, in response to the DYNAMIC indication, which indicates that the profile knowledge in the profile knowledge store 15 may be modified during the OPERATE phase, the executive control module 14 enables the verification data to be classified and transferred to the induction engine 11 (step 121), which generates additional profile rules for storage in the profile knowledge store 15 (step 122). The executive control module 14 may then exit (step 123).

An example, using a specific type of complex system, would provide an illustration of the utility and the operations of the adaptive management system depicted in FIG. 1. In one example, the adaptive management system provides security at one or more of a plurality of operating levels, including, for example, a user account level, a system operating level, and a network operating level, in a complex system comprising a digital data processing system, to ensure that an operator who is performing, for example, user account level activities in the digital data processing system is, in fact, the person who he or she has identified during user account level activities. Typically, while initiating a user account level session in a digital data processing system, the operator provides a name and password, and if the password matches one previously associated with the name, the digital data processing system accepts the operator and allows him to perform any system operations, such as process predetermined programs and use predetermined data, which have previously been allowed for the operator. On the other hand, if the password does not match one previously associated with the name, the digital data processing system refuses to let the operator perform such system operations. To provide security in a namepassword arrangement, the passwords must be kept secret.

The system can assist in providing security for a digital data processing system. Typically, an operator, when performing user account level activities, has certain characteristics, such as wishing to initially use certain programs and services provided by a digital data processing system, such as examining mail, transmitting messages, using certain assigned programs such as accounting or other programs, and the like. Further, operators have certain keystroke sequences and timings between keystrokes. The keystroke sequences, and especially the keystroke timings, will generally be unique among operators. These types of knowledge can be learned during the LEARN phase and stored in the profile knowledged store 15 as profile knowledge.

More specifically, during the LEARN phase, the operator provides one or more training example, each constituting an event data item. One training example is provided during each user account level activity session by the operator during the LEARN phase, and comprises the series of shell commands, as normally entered and interpreted by the command interpreter of the data processing system's operating system, the shell commands including command parameters and qualifiers. Each shell command, parameter and qualifier, as well as the order in which the operator enters them, is a data element in the event data item.

The data acquisition portion provides the event data item, and also augments the event data item with additional knowledge. For example, in one embodiment, the commands, parameters and qualifiers may be entered by means of abbreviations, and the data acquisition portion 10 augments the event data item to identify the abbreviation, if the operator actually enters the full command, or the full command if the operator actually enters the abbreviation. In addition, in the same embodiment the commands are classified according to a heuristic classification scheme and the data acquisition portion 10 identifies the classification for each command. The data acquisition portion 10 generates an acquired event data item, for use by the induction engine 11, that includes all of this knowledge, and identifies the order in which the operator entered each command, parameter and qualifier.

During the LEARN phase, the data acquisition portion 10 may generate a number of such acquired event data items, each associated with the operator identified during the user account level activity session. It will be appreciated that, if different operators have access to the digital data processing system, each will be identified with a different set of acquired event data items. At the end of the LEARN phase, the induction engine 11 receives all of the acquired event data items for each operator, and generates profile rules for each operator identifying the generalized order in which the operator entered the commands, parameters and qualifiers during the LEARN phase.

More specifically, the inductive engine 11 generates two types of rules representing profile knowledge. One type of rule associates sequences of acquired event data items with one or more particular operator names. In one embodiment, the rule associates sequential acquired event data items with a set of operator names. Each such rule includes a left hand side which contains two or more slot names for the commands, parameters and qualifiers sequentially entered by the operators. The right hand side of the rule identifies a group of operator names and a probability value associated with each operator. These rules may appear as follows:

| RULE 1 | |
|---|---|
| IF AND | (Slot1=CMD1) (Slot2=CMD2) (Slot3=CMD3) (Slot4=PARAM1) (Slot5=CMD4) |
| THEN | Operator=OP1 with (X1)% probability |
| | Operator=OP2 with (Y1)% probability |
| | Operator=OP3 with (Z1)% probability |
| RULE 2 | |
| IF AND | (Slot1=CMD1) (Slot2=CMD2) |
| THEN | Operator=OP1 with (X2)% probability |
| | Operator=OP2 with (Y2)% probability |
| | Operator=OP3 with (Z2)% probability |
| RULE 3 | |
| IF AND | (Slot1=CMD3) (Slot4=PARAM1) (Slot5=CMD4) |
| THEN | Operator=OP1 with (X3)% probability |

-continued

```
            Operator=OP2 with (Y3)% probability
            Operator=OP3 with (Z3)% probability
RULE 4
IF AND   (Slot2=CMD2) (Slot3=CMD3)
THEN     Operator=OP1 with (X4)% probability
         Operator=OP2 with (Y4)% probability
         Operator=OP3 with (Z4)% probability
```

This sequence of rules 1 through 4 would relate to entry, during an account level session, of the following commands and parameter:
>CMD1
>CMD2
>CMD3PARAM1
>CMD4
(each line representing a command separately entered at the account level by an operator) then the operator is one of operators OP1, OP2, and OP3 with probabilities that are functions of the respective probabilities set forth in the rules.

The second type of rule generated by the induction engine 11 representing profile knowledge expresses relative probabilities that sequentially-entered commands, parameters and qualifiers would be entered by a particular operator. The probabilities are based on the relative numbers of times the respective operators entered the particular sequence during the LEARN phase. Such a rule may appear as follows:

```
RULE 5
IF AND   (Operator=OP1) (Slot1=CMD1) (Slot 2=CMD2)
THEN     Probability (Slot3=CMD3) = (M)%
         Probability (Slot3=CMD4) = (N)%
         Probability (Slot3=CMD6) = (P)%
```

Where the sum of the probabilities totals one hundred percent.

During the OPERATE phase, the data acquisition portion 10 operates substantially as it does during the LEARN phase, and generates, during a user account level activity session by an operator, an event data item identifying the sequence of commands, parameters and qualifiers that the operator enters. This event data item is transferred to the profile comparator 12, which uses the profile rules in the profile knowledge store 15 to determine the sequence of commands, parameters and qualifiers entered by the operator during the user account level activity session corresponds to those identified with the operator during the LEARN phase.

If the profile comparator 12 determines, during a user account level activity session, that the sequences of commands, parameters and qualifiers entered by the operator during a user account level activity session do not correspond to the profile associated with the operator named during the user account level activity session, as identified by the profile rules in profile knowledge store 15, the executive control module 14 can initiate a CONFIRM sub-phase, in which the operator is requested to provide personal identifying knowledge, such as a birth date, mother's maiden name, and so forth, which has been previously entered in the profile knowledge store 15 as verification knowledge. The verification module 13 compares the knowledge provided by the operator to the verification knowledge in the verification module 13, and if they match determines that the operator attempting to initiate and perform an account level activity session is the operator named during the session, in which case the executive control module 14 enables the digital data processing system to allow the operator to continue using it.

Subsequent operations of the system depend on whether the executive control module 14 is receiving the STATIC indication or the DYNAMIC indication. If the executive control module 14 is receiving the STATIC indication, the executive control module 14 exits. On the other hand, if the executive control module 14 is receiving the DYNAMIC indication, the executive control module 14 initiates the ADAPT sub-phase, in which it directs the keystroke sequence and timing knowledge, which did not correspond to the profile knowledge in the profile knowledge store 15, to the induction engine 11 and enables it to provide new profile rules relating thereto for storage as profile knowledge in the profile knowledgement store 15. The new profile rules may then be used later during the OPERATE phase.

On the other hand, if, at the end of the CONFIRM sub-phase, if the verification module 13 determines that the verification knowledge provided by the operator does not conform to the verification knowledge in the profile knowledge store 15, the executive control module 14 can notify the digital data processing system's operating system, which can deny the operator further use of the digital data processing system. In addition, the executive control module 14 may notify a system operator or administrator, who can take further action in connection with the operator attempting to initiate and perform a user account level activity session.

The profile knowledge has been described as identifying the generalization of the sequences of commands, parameters and qualifiers in various training examples representing acquired event data items during the LEARN phase. It will be appreciated that the acquired event data items may have additional knowledge, including the sequences and timings of keystrokes, and so forth, which may further assist in verifying the identification of the operator.

As another example, the system may be used in real-time control of, for example, a chemical process plant. During a LEARN phase, the data acquisition portion 10 presents process control knowledge to the induction engine 11 relates to the times various chemicals are added, flow rates and temperatures at various sensors throughout the plant, and so forth. In response to this knowledge, the induction engine 11 generates profile rules the represent the process control knowledge, which is stored as profile knowledge in the profile knowledge store 15. During the OPERATE phase, the executive control module 14 directs the process control knowledge to the profile comparator 12, which determines whether the process control knowledge corresponds to the profile knowledge stored in the profile knowledge store 15. If so, the profile comparator 12 determines that the chemical process plant is operating as determined during the LEARN phase.

On the other hand, if the profile comparator 12 determines that the process control knowledge does not correspond to the profile knowledge stored in the profile knowledge store 15, the executive control module 14 initiates the CONFIRM sub-phase. In that condition, it may notify an operator of the discrepancy. If the operator indicates that the chemical process plant is properly operating, the executive control module 14 may exit if it is receiving the STATIC indication, or it may direct the process control knowledge to the induction engine 11 to initiate generation of additional profile knowledge if it is receiving the DYNAMIC indication.

It will be appreciated that these examples are only illustrative of the types of applications in which the system may be used, and the system may be used in myriad other applications.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A computer system comprising:
    A. a data acquisition portion for acquiring event data in response to selected events;
    B. an inductive engine for generating profile knowledge in response to event data received by said inductive engine;
    C. a profile knowledge store for storing profile knowledge generated by said inductive engine;
    D. a profile comparator for performing a verification operation in connection with comparing event data to said profile knowledge stored in said profile knowledge store; and
    E. a control portion for enabling event data acquired by said data acquisition portion to be directed to said inductive engine during a learning phase and to said profile comparator during an operational phase to thereby permit the comparator to perform a verification operation in connection with said event data acquired during said operational phase.

2. A system as defined in claim 1 wherein said data acquisition portion divides acquired event data into a plurality of classes, said control portion enabling said inductive engine to separately generate profile knowledge in connection with event data in each class, and to enable said profile comparator to separately perform said verification operation in connection with event data and profile knowledge in each class.

3. A system as defined in claim 1 in which a result of a verification operation is a verification failure, said profile knowledge store including a verification knowledge store for storing verification knowledge and said system further comprising a verification portion that performs a verification confirmation operation in connection with event data and the verification knowledge contained in said verification knowledge store, said control portion enabling said verification portion in response to a verification failure to confirm the result.

4. A system as defined in claim 3 wherein said verification portion further generates profile knowledge for storage in said profile knowledge store for use during a subsequent verification operation.

5. A system as defined in claim 1 in which the profile knowledge generated by said inductive engine is in the form of one or more rules stored in said profile knowledge store, said profile comparator using the event data to identify applicable rules and process them.

6. A computer implemented method comprising the steps of:
    A. acquiring, during a learning phase, training event data in response to selected events;
    B. enabling, during said learning phase, an inductive engine to receive acquired training event data and generating in response thereto profile knowledge;
    C. maintaining profile knowledge generated by said inductive engine for use during a later operational phase;
    D. acquiring, during an operational phase, operational event data in response to selected events
    E. using the profile knowledge and said operational event data to perform a verification operation in connection with said operational event data.

7. A method as defined in claim 6 wherein, during data acquisition during said learning phase, training event data is divided into a plurality of classes, said inductive engine separately generating profile knowledge in connection with training event data in each class, the operational event data acquired during said operational phase similarly being divided into a plurality of classes and the verification operation being performed in connection with operational event data and profile knowledge in each class.

8. A method as defined in claim 6 in which one result of a verification operation is a verification failure, said profile knowledge store including a verification knowledge store for storing verification knowledge, said method further comprising the step of a verification confirmation operation in connection with event data and the verification knowledge contained in said verification knowledge store in response to a verification failure to confirm the result.

9. A method as defined in claim 8 wherein said verification confirmation operation further includes the generation of profile knowledge for storage in said profile knowledge store for use during a subsequent verification operation.

10. A method as defined in claim 6 in which the profile knowledge generated by said inductive engine is in the form of one or more rules stored in said profile knowledge store and used during a verification operation.

* * * * *